(12) United States Patent
Kontani et al.

(10) Patent No.: US 11,878,768 B2
(45) Date of Patent: Jan. 23, 2024

(54) SADDLED VEHICLE

(71) Applicant: HONDA MOTOR CO., LTD., Tokyo (JP)

(72) Inventors: Masahiro Kontani, Wako (JP); Takeji Kawazumi, Wako (JP); Hiroshi Kurata, Wako (JP); Satoru Okoshi, Wako (JP); Atsushi Ogahara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 368 days.

(21) Appl. No.: 17/266,815

(22) PCT Filed: Aug. 6, 2019

(86) PCT No.: PCT/JP2019/030880
§ 371 (c)(1),
(2) Date: Feb. 8, 2021

(87) PCT Pub. No.: WO2020/039913
PCT Pub. Date: Feb. 27, 2020

(65) Prior Publication Data
US 2021/0347439 A1     Nov. 11, 2021

(30) Foreign Application Priority Data

Aug. 24, 2018   (JP) .................................. 2018-157194

(51) Int. Cl.
*B62M 7/02* (2006.01)
*B62J 11/19* (2020.01)
(Continued)

(52) U.S. Cl.
CPC ................ *B62M 7/02* (2013.01); *B62J 11/19* (2020.02); *B62J 37/00* (2013.01); *B62J 40/10* (2020.02); *B62J 45/414* (2020.02); *B62J 45/42* (2020.02)

(58) Field of Classification Search
CPC ... B62M 7/02; B62J 11/19; B62J 40/10; B62J 45/42; B62J 45/414; B62J 37/00
See application file for complete search history.

(56) References Cited

U.S. PATENT DOCUMENTS 9,879,642 B2 * 1/2018 Kato ................. F02M 35/10216
10,046,823 B2 * 8/2018 Azuma ................. B60T 8/1706
(Continued)

FOREIGN PATENT DOCUMENTS

CN      106553522 A    4/2017
CN      108698658 A    10/2018
(Continued)

OTHER PUBLICATIONS

The English portion of PCT/ISA/210 from International Application No. PCT/JP2019/030880.

*Primary Examiner* — Kevin Hurley
*Assistant Examiner* — Michael R Stabley
(74) *Attorney, Agent, or Firm* — Carrier, Shende and Associates P.C.; Fulchand P. Shende; Joseph P. Carrier (57) ABSTRACT

A saddled vehicle includes an air cleaner and a vehicle body movement sensor. The air cleaner takes travel wind in an air cleaner box to purify air of the travel wind and supplies the purified air to an internal combustion engine. The vehicle body movement sensor is received in a recess and measures movement of a vehicle body. The recess is defined by a flat surface that crosses a rear wall of the air cleaner box. This provides a saddled vehicle including a vehicle body movement sensor that is disposed without reducing the volume of an air cleaner box.

20 Claims, 6 Drawing Sheets

(51) Int. Cl.
  *B62J 40/10*    (2020.01)
  *B62J 45/42*    (2020.01)
  *B62J 45/414*   (2020.01)
  *B62J 37/00*    (2006.01)

(56) References Cited

U.S. PATENT DOCUMENTS

| | | | |
|---|---|---|---|
| 10,124,853 B2 * | 11/2018 | Iwamoto | B62M 7/02 |
| 10,336,269 B2 * | 7/2019 | Usa | B62J 45/41 |
| 10,377,439 B2 * | 8/2019 | Nakamura | B62J 23/00 |
| 10,647,374 B1 * | 5/2020 | Akita | B62J 1/12 |
| 10,960,949 B2 * | 3/2021 | Khanna | B62K 11/14 |
| 2016/0348621 A1 | 12/2016 | Kato et al. | |
| 2016/0348622 A1 * | 12/2016 | Hotta | F02D 9/1035 |
| 2017/0088210 A1 | 3/2017 | Azuma et al. | |
| 2017/0259872 A1 * | 9/2017 | Iwamoto | B62J 45/42 |
| 2017/0282818 A1 | 10/2017 | Usa et al. | |
| 2018/0339745 A1 | 11/2018 | Nakamura et al. | |

FOREIGN PATENT DOCUMENTS

| | | |
|---|---|---|
| DE | 10 2016 208 699 A1 | 12/2016 |
| EP | 3 147 188 A1 | 3/2017 |
| EP | 3 239 008 A1 | 11/2017 |
| EP | 3 428 047 A1 | 1/2019 |
| JP | 2008-074289 A | 4/2008 |
| JP | 2014-069696 A | 4/2014 |
| JP | 2016-222119 A | 12/2016 |
| JP | 2017-065307 A | 4/2017 |
| JP | 2017-178037 A | 10/2017 |
| WO | 2017/154437 A1 | 9/2017 |

* cited by examiner

SADDLED VEHICLE

FIELD

The present invention relates to a saddled vehicle including an internal combustion engine for generating power and an air cleaner for taking travel wind in an air cleaner box to purify air of the travel wind and for supplying the purified air to the internal combustion engine.

BACKGROUND

Patent literature 1 discloses a vehicle body movement sensor or an inertial measurement unit. The vehicle body movement sensor is mounted on a top surface of an air cleaner box and measures angular velocity and acceleration around three orthogonal axes. The attitude of a vehicle body in turning traveling is determined on the basis of angular velocity and acceleration around three orthogonal axes. The measured results of the vehicle body movement sensor are supplied to an anti-lock braking system (ABS) controller. The ABS controller sets appropriate hydraulic pressure of a brake, to a wheel, so as to avoid locking of the wheel in turning traveling of a motorcycle.

CITATION LIST

Patent Literature

Patent literature 1: Japanese Unexamined Patent Application Laid-Open No. 2017-65307
Patent literature 2: Japanese Unexamined Patent Application Laid-Open No. 2014-69696

BRIEF SUMMARY

Technical Problem

A recess for receiving a vehicle body movement sensor is formed on a top surface of an air cleaner box. A coupler of a sensor harness is inserted from a vehicle width direction in the vehicle body movement sensor. In order to receive the coupler in the recess, the recess tends to be large, and the volume of the air cleaner box is reduced.

The present invention has been made in view of these circumstances, and an object of the present invention is to provide a saddled vehicle including a vehicle body movement sensor that is disposed without reducing the volume of an air cleaner box.

Solution to Problem

A first aspect of the present invention provides a saddled vehicle including an internal combustion engine, an air cleaner, and a vehicle body movement sensor. The internal combustion engine is configured to generate power. The air cleaner is configured to take travel wind in an air cleaner box to purify air of the travel wind and is configured to supply the purified air to the internal combustion engine. The vehicle body movement sensor is received in a recess and is configured to measure movement of a vehicle body. The recess is defined by a flat surface that crosses a rear wall of the air cleaner box.

In a second aspect, in addition to the configuration of the first aspect, a coupler of a sensor harness may be joined to the vehicle body movement sensor from behind.

In a third aspect, in addition to the configuration of the second aspect, a lateral center plane of the vehicle body movement sensor may be disposed on a lateral center plane of the vehicle body.

In a fourth aspect, in addition to the configuration of the second or the third aspect, the sensor harness may be folded back into a U-shape to extend forward.

In a fifth aspect, in addition to the configuration of the fourth aspect, the air cleaner box may be formed with a harness recess that is continuous with the recess and that receives the sensor harness.

In a sixth aspect, in addition to the configuration of any one of the first to the fifth aspects, the flat surface may be an inclined surface that goes down rearward so as to cross at an inclined angle of 45 degrees to the rear wall.

In a seventh aspect, in addition to the configuration of any one of the first to the sixth aspects, the vehicle body movement sensor may be covered from above with a fuel tank that is disposed behind the air cleaner box.

In an eighth aspect, in addition to the configuration of any one of the first to the seventh aspects, the saddled vehicle may further include an upper injector and a fuel supply pipe. The upper injector may be fitted into an upper wall of the air cleaner box and may be configured to inject fuel downwardly toward a funnel. The funnel may be disposed on a rear side in the air cleaner box. The fuel supply pipe may be disposed forward of the vehicle body movement sensor and may extend in a vehicle width direction. The fuel supply pipe may be configured to supply fuel to the upper injector.

In a ninth aspect, in addition to the configuration of the eighth aspect, the air cleaner box may be formed with a tube recess that is continuous with the recess and that receives a fuel supply tube, and the fuel supply tube may be connected to the fuel supply pipe and may extend to a side of the vehicle body movement sensor.

In a tenth aspect, in addition to the configuration of the fifth aspect, an upper injector, a fuel supply pipe, and a fuel supply tube may be included. The upper injector may be fitted into an upper wall of the air cleaner box and may be configured to inject fuel downwardly toward a funnel. The funnel may be disposed on a rear side in the air cleaner box. The fuel supply pipe may be disposed forward of the vehicle body movement sensor and may extend in a vehicle width direction. The fuel supply pipe may be configured to supply fuel to the upper injector. The fuel supply tube may be connected to the fuel supply pipe and may extend to a side of the vehicle body movement sensor on a side opposite to the sensor harness across the vehicle body movement sensor. The air cleaner box may be formed with a tube recess that receives the fuel supply tube on a side opposite to the harness recess across the vehicle body movement sensor.

Advantageous Effects

In the first aspect, the recess, which is defined by the flat surface crossing the rear wall of the air cleaner box, opens to the rear of the air cleaner box. The vehicle body movement sensor is disposed in such a manner as to protrude slightly rearward from the recess, and the recess itself is reduced in dimensions. This prevents reduction in volume of the air cleaner box.

In the second aspect, the vehicle body movement sensor and the coupler of the sensor harness are aligned in the front-rear direction of the vehicle, and therefore, the recess is reduced in dimensions in the vehicle width direction. This prevents reduction in volume of the air cleaner box.

In the third aspect, the lateral center plane of the vehicle body movement sensor and the lateral center plane of the vehicle body overlap each other, whereby movement of the vehicle body is measured with high accuracy.

In the fourth aspect, the sensor harness is efficiently disposed on the air cleaner box.

In the fifth aspect, the sensor harness is efficiently disposed on the air cleaner box.

In the sixth aspect, the recess is defined by the inclined surface crossing at the inclined angle of 45 degrees, whereby the recess is sufficiently recessed from above and rearward. This enables efficiently disposing the vehicle body movement sensor.

In the seventh aspect, the vehicle body movement sensor, which is covered with the fuel tank from above, is protected, although not being mounted with a protective member specific to the vehicle body movement sensor.

In the eighth aspect, the vehicle body movement sensor is disposed behind the fuel supply pipe in a compact manner.

In the ninth aspect, the fuel supply tube is efficiently disposed on the air cleaner box.

In the tenth aspect, the fuel supply tube and the sensor harness are disposed around the vehicle body movement sensor in a compact manner. This enables reducing dimensions of the recess for receiving the vehicle body movement sensor, the fuel supply tube, and the sensor harness, on the air cleaner box, as much as possible.

REFERENCE SIGNS LIST

11 . . . saddled vehicle (motorcycle)
15 . . . fuel tank
31 . . . internal combustion engine
37 . . . air cleaner
47 . . . air cleaner box
49 . . . rear wall
52 . . . upper injector
53 . . . fuel supply pipe (first fuel supply pipe)
57 . . . fuel supply tube
59 . . . funnel
64 . . . vehicle body movement sensor (inertial measurement unit)
66 . . . sensor harness
67 . . . coupler
73 . . . recess
73a . . . flat surface (crossing a rear wall)
74 . . . (tube) recess
75 . . . (harness) recess
SP . . . lateral center plane (of a vehicle body movement sensor)
RL . . . lateral center plane (of a vehicle body)

DETAILED DESCRIPTION

The following describes an embodiment with reference to the attached drawings. Herein, an up-down direction, a front-rear direction, and a right-left direction are specified based on a line of sight of a passenger riding on a motorcycle.

FIRST EMBODIMENT

Figure 1:
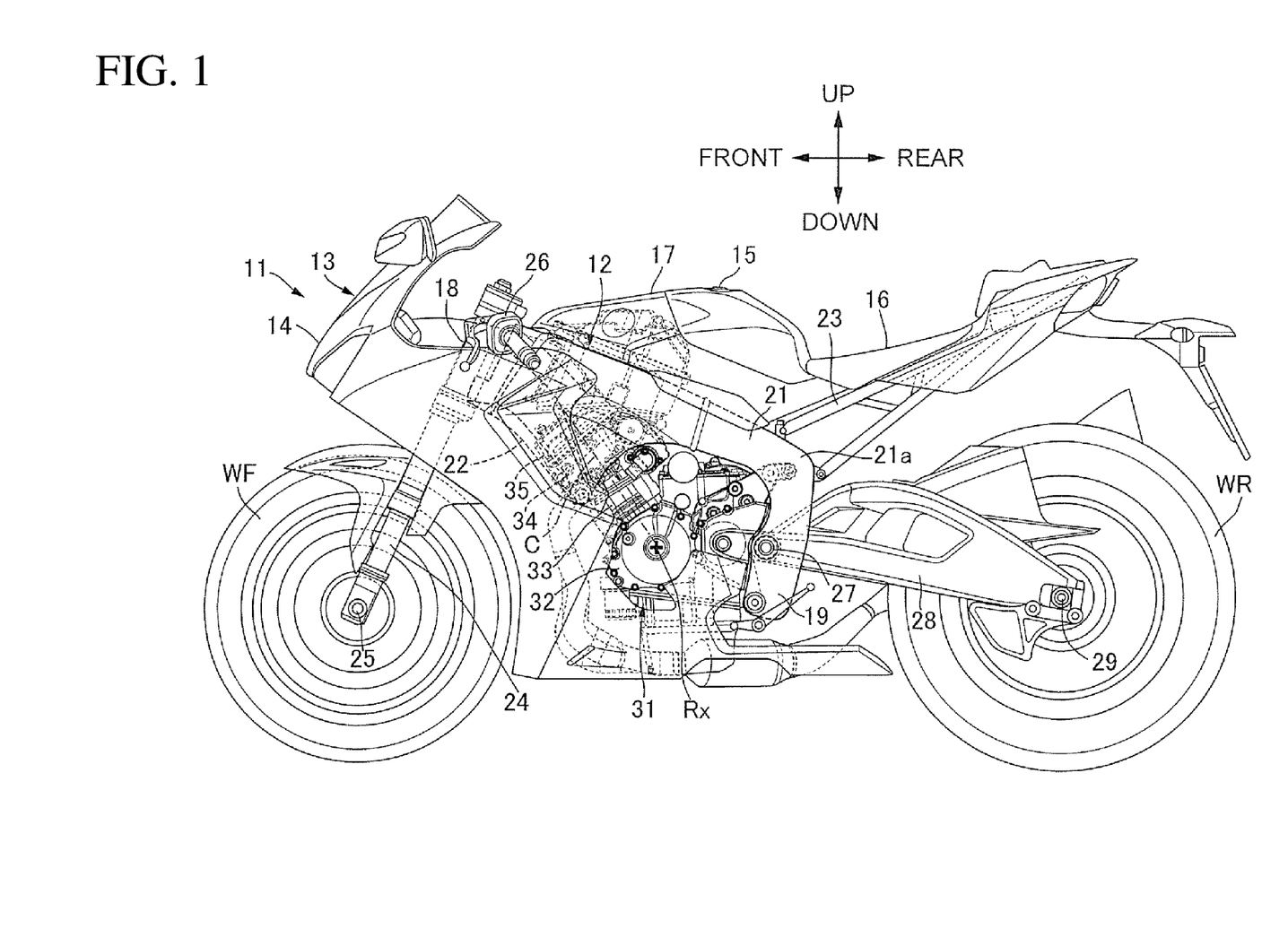
FIG. 1 is a side view schematically showing an overall structure of a motorcycle according to an embodiment (first embodiment).

FIG. 1 schematically shows the whole motorcycle as a saddled vehicle according to an embodiment of the present invention. A motorcycle 11 includes a vehicle body frame 12 and a vehicle body cover 13 mounted on the vehicle body frame 12. The vehicle body cover 13 has a front cowl 14 and a tank cover 17. The front cowl 14 covers the vehicle body frame 12 from forward. The tank cover 17 is continuous from an outer surface of a fuel tank 15 toward the front side and is connected to a passenger seat 16 behind the fuel tank 15. The fuel tank 15 stores fuel. A passenger rides on the passenger seat 16 in driving the motorcycle 11.

The vehicle body frame 12 has a head pipe 18, paired right and left main frames 21, a down frame 22, and right and left seat frames 23. The main frames 21 extend downwardly rearward from the head pipe 18 and have pivot frames 19 at rear lower ends. The down frame 22 extends downward from the head pipe 18 at a position under the main frame 21 and is integrated with the main frames 21. The seat frames 23 extend upwardly rearward from curved regions 21a of the main frames 21 and constitute truss structures. The seat frames 23 support the passenger seat 16.

The head pipe 18 steerably supports a front fork 24. The front fork 24 supports a front wheel WF in a manner rotatable on an axle 25. A steering handlebar 26 is joined at an upper end of the front fork 24. A driver holds hand grips at right and left ends of the steering handlebar 26 in driving the motorcycle 11.

A swing arm 28 is coupled to the vehicle body frame 12 on a rear side of the vehicle in such a manner as to vertically swingable around a pivot 27. A rear wheel WR is supported at a rear end of the swing arm 28 in a manner rotatable on an axle 29. An internal combustion engine 31 for generating power to be transmitted to the rear wheel WR is mounted to the vehicle body frame 12 between the front wheel WF and the rear wheel WR. The internal combustion engine 31 is supported by being coupled to the down frame 22 and the main frame 21. The power of the internal combustion engine 31 is transmitted to the rear wheel WR via a transmission.

Figure 2:
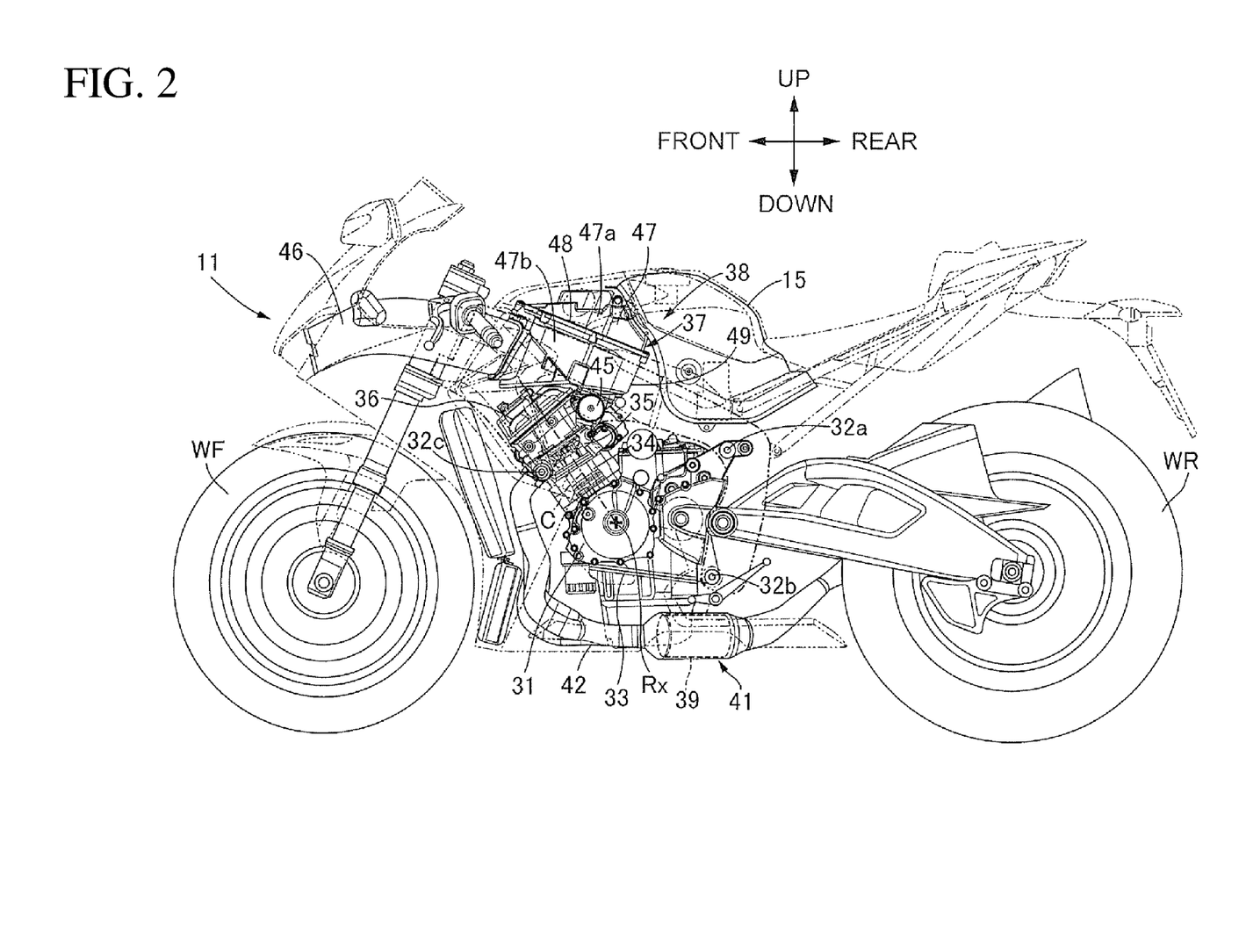
FIG. 2 is a side view schematically showing an overall structure of the motorcycle from which a vehicle body cover is removed (first embodiment).

As shown in FIG. 2, the engine body of the internal combustion engine 31 has a crankcase 33, a cylinder block 34, a cylinder head 35, and a head cover 36. The crankcase 33 has engine hangers 32a and 32b at upper and lower ends of a rear wall and outputs power around a rotation axis Rx. The engine hangers 32a and 32b are coupled to the main frame 21. The cylinder block 34 is joined to a front part of the crankcase 33 from above and has a cylinder axis C. The cylinder axis C is positioned on a vertical plane orthogonal to the rotation axis Rx and rises from a horizontal plane. The cylinder head 35 is joined to an upper end of the cylinder block 34, has an engine hanger 32c at a front wall, and supports a valve mechanism. The engine hanger 32c is coupled to the down frame 22. The head cover 36 is joined to an upper end of the cylinder head 35 and covers the valve mechanism on the cylinder head 35. Herein, four cylinders are serially arranged in the cylinder block 34, in a vehicle width direction determined by the rotation axis Rx parallel to the axle 29.

An intake unit 38 and an exhaust unit 41 are connected to the cylinder head 35. The intake unit 38 generates air-fuel mixture by injecting fuel to air that is purified in the air cleaner 37, and the intake unit 38 supplies the air-fuel mixture to a combustion chamber that is covered with the cylinder head 35. The exhaust unit 41 purifies exhaust gas, which is discharged from the combustion chamber after combustion, by using catalyst 39, and the exhaust unit 41 discharges the purified exhaust gas toward the rear of the vehicle body while lowering temperature of the purified exhaust gas. The exhaust unit 41 passes under the crankcase 33 and extends along the side of the rear wheel WR. The exhaust unit 41 includes an exhaust pipe 42 for supporting the catalyst 39, under the crankcase 33.

The air cleaner 37 is joined to the cylinder head 35 via a throttle body 45 and includes an air cleaner box 47. The air cleaner box 47 takes in travel wind from an air duct 46 that opens in front of the head pipe 18. The air cleaner 37 takes travel wind in the air cleaner box 47 to purify air of the travel wind and supplies the purified air to the internal combustion engine 31. The air cleaner box 47 is covered with the fuel tank 15 from behind. The air cleaner box 47 has an upper body 47a and a lower body 47b that are mutually joined at a mating surface 48 set along a plane going down rearward. The upper body 47a and the lower body 47b has rear walls 49 that extend in the vehicle width direction while perpendicularly crossing the mating surface 48.

Figure 3:
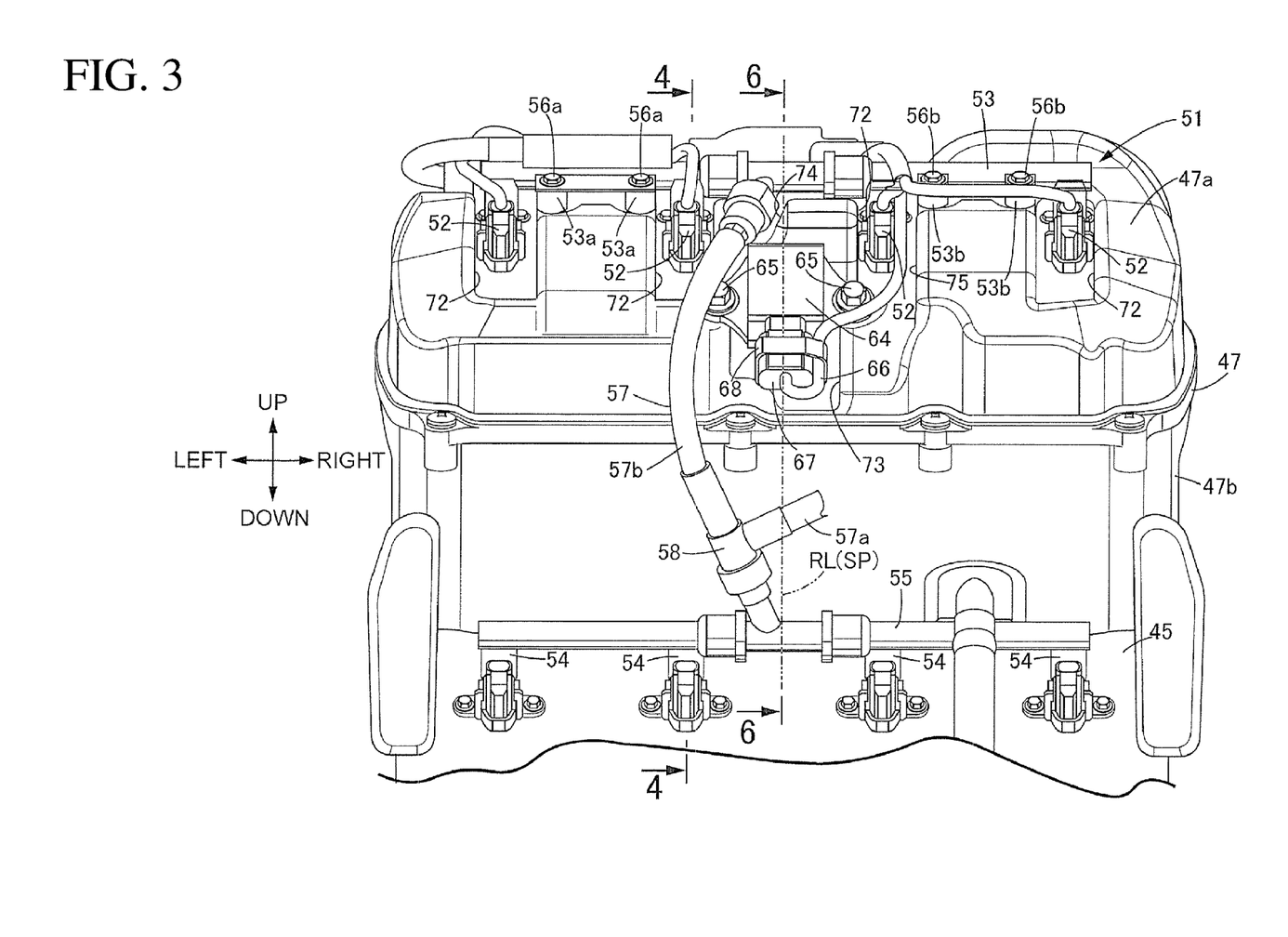
FIG. 3 is an enlarged rear view of an air cleaner box as seen from the rear (first embodiment).

As shown in FIG. 3, a fuel supply unit 51 includes upper injectors 52, a first fuel supply pipe 53, main injectors 54, and a second fuel supply pipe 55. The upper injectors 52 are fitted into an upper wall of the air cleaner box 47 with respect to respective cylinders. The first fuel supply pipe 53 extends linearly in the vehicle width direction on the air cleaner box 47 and supplies fuel to respective upper injectors 52 from branch pipes corresponding to the respective upper injectors 52. The main injectors 54 are fitted into the throttle body 45 with respect to respective cylinders. The second fuel supply pipe 55 extends linearly in the vehicle width direction behind the throttle body 45 and supplies fuel to respective main injectors 54 from branch pipes corresponding to the respective main injectors 54. The first fuel supply pipe 53 is formed with two brackets 53a and two brackets 53b. The brackets 53a are disposed between paired upper injectors 52 on the left and are respectively fixed to the upper wall of the air cleaner box 47 by bolts 56a. The brackets 53b are disposed between paired upper injectors 52 on the right and are respectively fixed to the upper wall of the air cleaner box 47 by bolts 56b. Each of the brackets 53a and 53b is stacked on the upper wall of the air cleaner box 47.

A fuel supply tube 57 is connected to the first fuel supply pipe 53 and the second fuel supply pipe 55. The fuel supply tube 57 includes a first tube 57a and a second tube 57b. The first tube 57a extends from a fuel pump that is disposed in the fuel tank 15, and the first tube 57a is connected to a connection pipe 58 that is fixed to the second fuel supply pipe 55. The second tube 57b branches from the connection pipe 58 of the second fuel supply pipe 55 and is connected to the first fuel supply pipe 53. Fuel in the fuel tank 15 is forcibly supplied to the first fuel supply pipe 53 and to the second fuel supply pipe 55 by action of the fuel pump.

Figure 4:
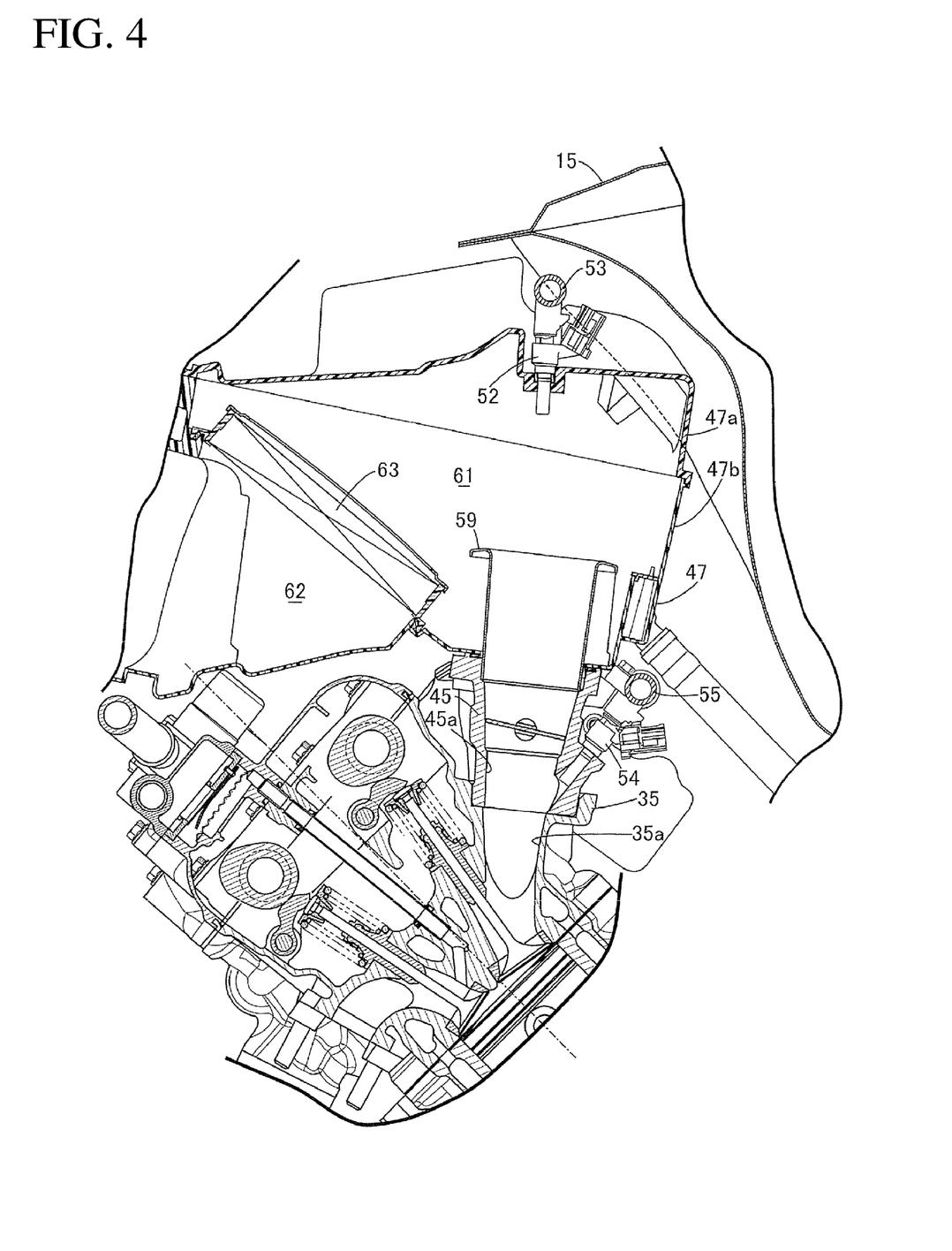
FIG. 4 corresponds to a vertical sectional view along a 4-4 line in FIG. 3 and schematically shows a structure of an intake unit (first embodiment).

Each of the upper injectors 52 injects fuel downwardly toward a funnel 59 that is disposed rearward in the air cleaner box 47, as shown in FIG. 4. The funnel 59 is joined to the throttle body 45 with respect to each cylinder. The funnel 59 penetrates through a bottom wall of the air cleaner box 47 that is stacked on the throttle body 45, to protrude into a clean room 61 in the air cleaner box 47. The space in the air cleaner box 47 is divided into a front side dirty room 62 and a rear side clean room 61 by an air cleaner element 63. The dirty room 62 is connected to the air duct 46 to introduce travel wind therefrom. Air in the dirty room 62 is filtered by the air cleaner element 63 and flows in the clean room 61. The purified air flows from the funnel 59 in an intake port 35a of the cylinder head 35 via an intake passage 45a in the throttle body 45. In a low rotation range of the internal combustion engine 31, fuel is injected from the main injector 54 in the intake passage 45a in the throttle body 45. In a high rotation range of the internal combustion engine 31, fuel is injected from the upper injector 52 in the clean room 61, and a mixing ratio is adjusted by fuel injected from the main injector 54.

As shown in FIG. 3, a vehicle body movement sensor, that is, an inertial measurement unit (IMU) 64, is mounted behind the first fuel supply pipe 53, on the upper body 47a of the air cleaner box 47. The inertial measurement unit 64 measures inertial force in accordance with three orthogonal axes extending in the front-rear direction, the up-down direction, and the right-left direction. Movement of the vehicle body is determined on the basis of the measured inertial force. The inertial measurement unit 64 is stacked on the upper wall of the air cleaner box 47 and is fixed to the air cleaner box 47 by paired right and left bolts 65. The inertial measurement unit 64 has a lateral center plane SP that is disposed on a lateral center plane RL of the vehicle body. The inertial measurement unit 64 is formed into a shape symmetric laterally with respect to the lateral center plane SP. The center of the three orthogonal axes of the inertial measurement unit 64 is positioned on the lateral center plane SP. The lateral center plane RL of the vehicle body is orthogonal to a shaft center of the axle and laterally divides the vehicle body, at least the head pipe 18 and the rear wheel WR, into two. The upper injectors 52 and the main injectors 54 are arranged in a laterally symmetrical manner with respect to the lateral center plane RL of the vehicle body. The axis of the first fuel supply pipe 53 and the axis of the second fuel supply pipe 55 are orthogonal to the lateral center plane RL of the vehicle body. In addition, instead of the inertial measurement unit 64, the vehicle body movement sensor can use each type of device that measures movement of the vehicle body as physical movement.

A coupler 67 of a sensor harness 66 is joined to the inertial measurement unit 64 from behind. The sensor harness 66 extends rearward from the coupler 67. A lateral center plane of a connection end of each of the coupler 67 and the sensor harness 66 coincides with the lateral center plane SP of the inertial measurement unit 64. The sensor harness 66 is folded back into a U-shape to extend forward and is bound to a side surface of the coupler 67 by a band 68.

Figure 5:
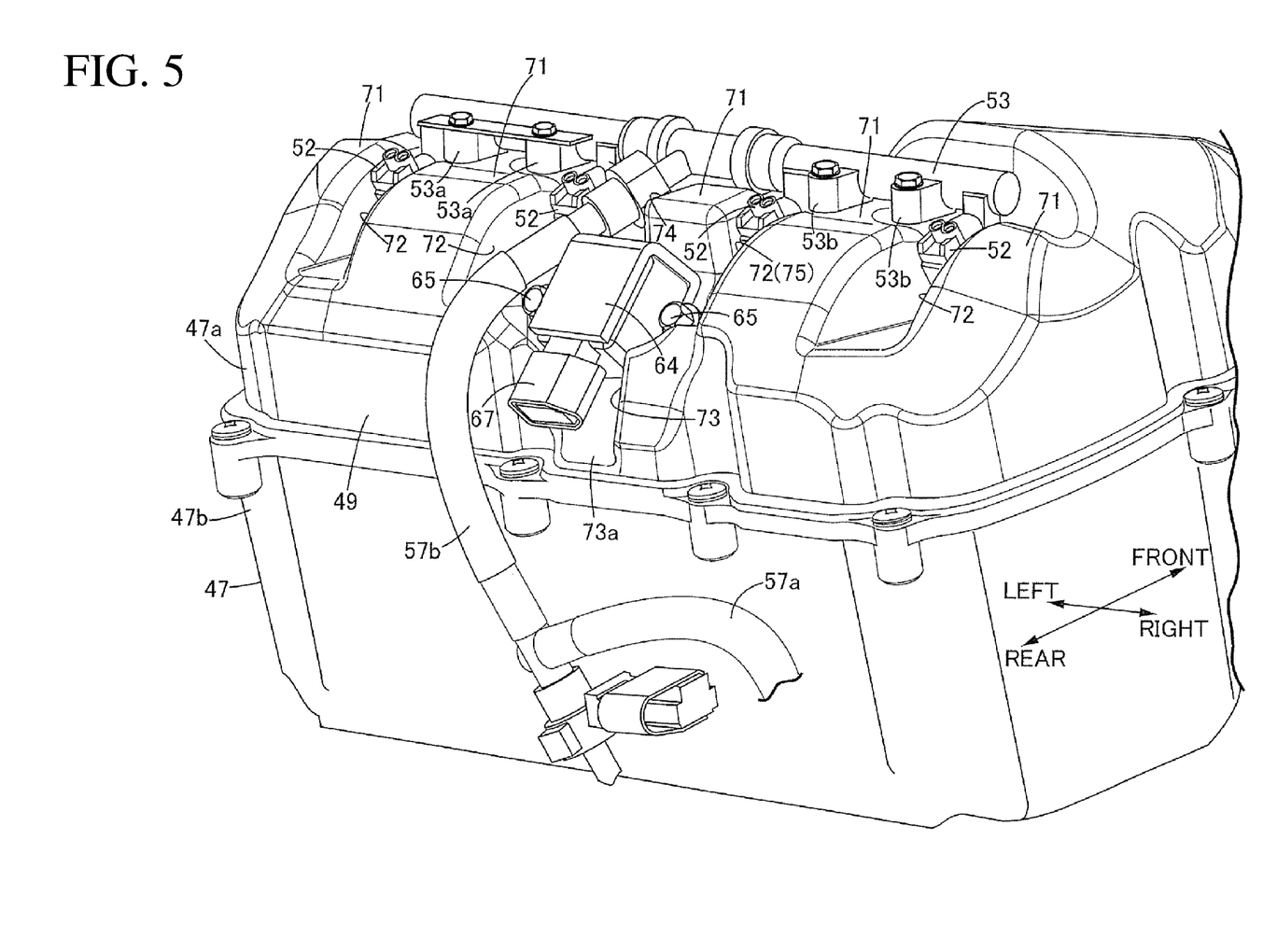
FIG. 5 is an enlarged perspective view of the air cleaner box as seen obliquely from the rear (first embodiment).

As shown in FIG. 5, recesses (hereinafter called "injector recesses") 72 and a recess (hereinafter called a "unit recess") 73 are formed to the upper body 47a of the air cleaner box 47. The injector recesses 72 are recessed from a mounting surface 71 that receives the brackets 53a and 53b of the first fuel supply pipe 53, and the injector recesses 72 respectively receive the upper injectors 52. The unit recess 73 is defined by a flat surface 73a that crosses the rear wall 49 of the air cleaner box 47 and receives the inertial measurement unit 64. Herein, the mounting surface 71 of the brackets 53a and 53b extends along a plane parallel to the mating surface 48 and is connected to the rear wall 49 while curving downward as it goes rearward. The injector recess 72 has a depth enough to hide the upper injector 52 from the mounting surface 71. The right and left sides in the vehicle width direction of the injector recess 72 are defined by flat surfaces orthogonal to the axis of the first fuel supply pipe 53. The bottom of the injector recess 72 is defined by a flat surface that slightly rises toward the rear relative to the plane parallel to the mating surface 48. One of the injector recesses 72 at the center is continuous with the unit recess 73 and forms a recess for tube (hereinafter called a "tube recess") 74 for receiving the fuel supply tube 57, which extends to the side of the inertial measurement unit 64. The other of the injector recesses 72 at the center is continuous with the unit recess 73 and forms a harness recess 75 for receiving the sensor harness 66, which extends to the side of the upper injector 52.

Figure 6:
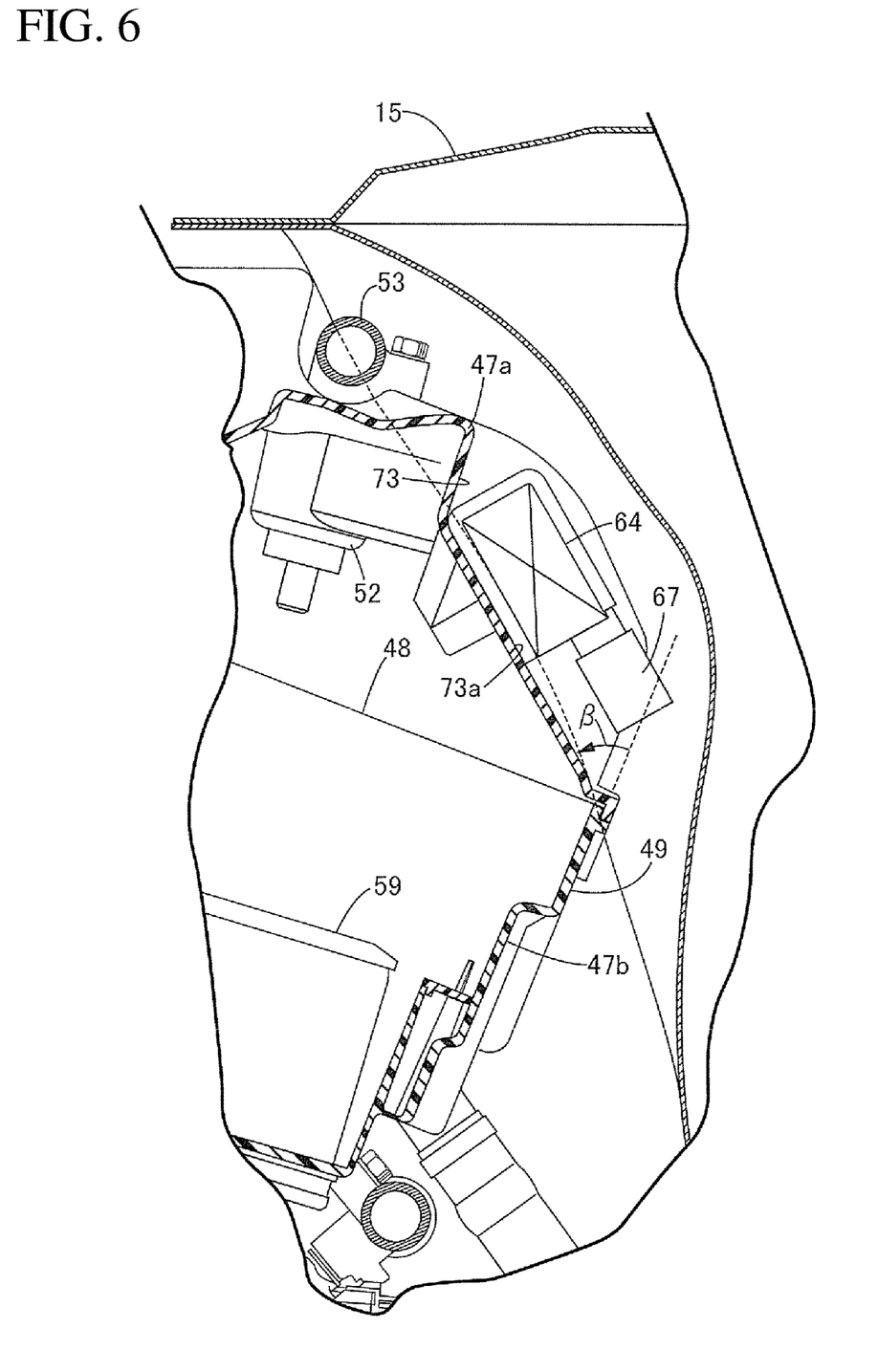
FIG. 6 corresponds to a vertical sectional view along a 6-6 line in FIG. 3 and schematically shows a structure of a recess (first embodiment).

As shown in FIG. 6, the flat surface 73a defines the bottom of the unit recess 73, and the flat surface 73a is an inclined surface that goes down rearward so as to cross at an inclined angle β of 45 degrees to a flat surface 76 defining the rear wall 49. A rear end of the unit recess 73 is positioned at a boundary between the upper body 47a and the lower body 47b, or at the mating surface 48. The inertial measurement unit 64 is covered from above with the fuel tank 15, which is disposed behind the air cleaner box 47.

Next, operation of the motorcycle 11 according to this embodiment will be described. While the internal combustion engine 31 works, the first fuel supply pipe 53 and the second fuel supply pipe 55 are supplied with fuel under a specified pressure from the fuel tank 15. The air cleaner 37 takes travel wind in the air cleaner box 47 to purify air of the travel wind and supplies the purified air to the internal combustion engine 31. In a low rotation range of the internal combustion engine 31, fuel is injected from the main injector 54 in the intake passage 45a in the throttle body 45. The air-fuel mixture, which is generated in accordance with injection of the fuel, is introduced from the intake port 35a to the internal combustion engine 31. The internal combustion engine 31 generates power in accordance with combustion of the air-fuel mixture.

In a high rotation range of the internal combustion engine 31, fuel is injected from the upper injector 52 in the clean room 61. A primary air-fuel mixture is generated in accordance with injection of the fuel and flows from the funnel 59 in the intake passage 45a. Fuel is injected from the main injector 54 in the intake passage 45a. The mixing ratio is adjusted by the fuel that is injected from the main injector 54. The primary air-fuel mixture thus adjusted provides secondary air-fuel mixture, and this air-fuel mixture is introduced from the intake port 35a in the combustion chamber of the internal combustion engine 31. The internal combustion engine 31 generates power in accordance with combustion of the secondary air-fuel mixture.

During traveling of the motorcycle 11, the inertial measurement unit 64 measures angular velocity and acceleration around the three orthogonal axes. The measured values are supplied to the anti-lock braking system (ABS) controller via the sensor harness 66. The attitude of the vehicle body in turning traveling is determined on the basis of angular velocity and acceleration around the three orthogonal axes. In response to braking, the ABS controller adjusts hydraulic pressure of brake in accordance with movement of the vehicle body. The ABS controller sets appropriate hydraulic pressure of the brake to the wheels WF and WR so as to avoid locking of the wheels WF and WR in turning traveling of the motorcycle 11.

In this embodiment, the inertial measurement unit 64 is received in the unit recess 73, which is defined by the flat surface 73a crossing the rear wall 49 of the air cleaner box 47. The unit recess 73, which is defined by the flat surface 73a crossing the rear wall 49 of the air cleaner box 47, opens to the rear of the air cleaner box 47. The inertial measurement unit 64 is disposed in such a manner as to protrude slightly rearward from the unit recess 73, and the unit recess 73 itself is reduced in dimensions. This prevents reduction in volume of the air cleaner box 47. The inertial measurement unit 64 is disposed behind the first fuel supply pipe 53 in a compact manner.

The coupler 67 of the sensor harness 66 is joined to the inertial measurement unit 64 from behind. The inertial measurement unit 64 and the coupler 67 of the sensor harness 66 are aligned in the front-rear direction of the vehicle, and therefore, the unit recess 73 is reduced in dimensions in the vehicle width direction. This prevents reduction in volume of the air cleaner box 47.

The lateral center plane SP of the inertial measurement unit 64 is disposed on the lateral center plane RL of the vehicle body. The lateral center plane SP of the inertial measurement unit 64 and the lateral center plane RL of the vehicle body overlap or coincide with each other, whereby movement of the vehicle body is measured with high accuracy.

In this embodiment, the sensor harness 66 extends rearward from the coupler 67 and is folded back into a U-shape to extend forward. The sensor harness 66 is thus efficiently disposed on the air cleaner box 47. Moreover, the air cleaner box 47 is formed with the harness recess 75, which is continuous with the unit recess 73 and receives the sensor harness 66. As a result, the sensor harness 66 is efficiently disposed on the air cleaner box 47.

The flat surface 73a, which defines the bottom of the unit recess 73, is the inclined surface that goes down rearward so as to cross at the inclined angle β of 45 degrees to the rear wall 49. The unit recess 73 is thus defined by the inclined surface crossing at the inclined angle β of 45 degrees, whereby the unit recess 73 is sufficiently recessed from above and rearward. This enables efficiently disposing the inertial measurement unit 64.

In this embodiment, the inertial measurement unit 64 is covered from above with the fuel tank 15, which is disposed behind the air cleaner box 47. The inertial measurement unit 64, which is thus covered with the fuel tank 15 from above, is protected, although not being mounted with a protective member specific to the inertial measurement unit 64.

In this embodiment, the air cleaner box 47 is formed with the tube recess 74, which is continuous with the unit recess 73 and receives the fuel supply tube 57. Thus, the fuel supply tube 57 is efficiently disposed on the air cleaner box 47.

The air cleaner box 47 according to this embodiment is formed with the tube recess 74, which receives the fuel supply tube 57 on a side opposite to the harness recess 75 across the inertial measurement unit 64. Thus, the fuel supply tube 57 and the sensor harness 66 are disposed around the inertial measurement unit 64 in a compact manner. This enables reducing dimensions of the recess for receiving the inertial measurement unit 64, the fuel supply tube 57, and the sensor harness 66, on the air cleaner box 47, as much as possible.

The invention claimed is:
1. A saddled vehicle comprising:
an internal combustion engine configured to generate power;

an air cleaner box having
    an upper body and a lower body that are mutually joined at a mating surface;
    a rear wall, and
    a recess defined by a flat surface, the flat surface configured to cross the rear wall,
    the recess having a rear end positioned at the mating surface;
an air cleaner configured to take travel wind in the air cleaner box to purify air of the travel wind and configured to supply the purified air to the internal combustion engine; and
a vehicle body movement sensor received in the recess and configured to measure movement of a vehicle body.

2. The saddled vehicle according to claim 1, wherein a coupler of a sensor harness is joined to the vehicle body movement sensor from behind.

3. The saddled vehicle according to claim 2, wherein a lateral center plane of the vehicle body movement sensor is disposed on a lateral center plane of the vehicle body.

4. The saddled vehicle according to claim 3, wherein the sensor harness is folded back into a U-shape to extend forward.

5. The saddled vehicle according to claim 3, wherein the flat surface is an inclined surface that goes down rearward so as to cross at an inclined angle of 45 degrees to the rear wall.

6. The saddled vehicle according to claim 3, wherein the vehicle body movement sensor is covered from above with a fuel tank that is disposed behind the air cleaner box.

7. The saddled vehicle according to claim 2, wherein the sensor harness is folded back into a U-shape to extend forward.

8. The saddled vehicle according to claim 7, wherein the air cleaner box is formed with a harness recess that is continuous with the recess and that receives the sensor harness.

9. The saddled vehicle according to claim 8, further comprising:
    an upper injector fitted into an upper wall of the air cleaner box and configured to inject fuel downwardly toward a funnel, the funnel being disposed on a rear side in the air cleaner box;
    a fuel supply pipe disposed forward of the vehicle body movement sensor and extending in a vehicle width direction, the fuel supply pipe configured to supply fuel to the upper injector; and
    a fuel supply tube connected to the fuel supply pipe and extending to a side of the vehicle body movement sensor on a side opposite to the sensor harness across the vehicle body movement sensor,
    wherein the air cleaner box is formed with a tube recess that receives the fuel supply tube on a side opposite to the harness recess across the vehicle body movement sensor.

10. The saddled vehicle according to claim 8, wherein the flat surface is an inclined surface that goes down rearward so as to cross at an inclined angle of 45 degrees to the rear wall.

11. The saddled vehicle according to claim 8, wherein the vehicle body movement sensor is covered from above with a fuel tank that is disposed behind the air cleaner box.

12. The saddled vehicle according to claim 7, wherein the flat surface is an inclined surface that goes down rearward so as to cross at an inclined angle of 45 degrees to the rear wall.

13. The saddled vehicle according to claim 7, wherein the vehicle body movement sensor is covered from above with a fuel tank that is disposed behind the air cleaner box.

14. The saddled vehicle according to claim 2, wherein the flat surface is an inclined surface that goes down rearward so as to cross at an inclined angle of 45 degrees to the rear wall.

15. The saddled vehicle according to claim 2, wherein the vehicle body movement sensor is covered from above with a fuel tank that is disposed behind the air cleaner box.

16. The saddled vehicle according to claim 1, wherein the flat surface is an inclined surface that goes down rearward so as to cross at an inclined angle of 45 degrees to the rear wall.

17. The saddled vehicle according to claim 1, wherein the vehicle body movement sensor is covered from above with a fuel tank that is disposed behind the air cleaner box.

18. The saddled vehicle according to claim 1, further comprising:
    an upper injector fitted into an upper wall of the air cleaner box and configured to inject fuel downwardly toward a funnel, the funnel being disposed on a rear side in the air cleaner box; and
    a fuel supply pipe disposed forward of the vehicle body movement sensor and extending in a vehicle width direction, the fuel supply pipe configured to supply fuel to the upper injector.

19. The saddled vehicle according to claim 18, wherein the air cleaner box is formed with a tube recess that is continuous with the recess and that receives a fuel supply tube, and the fuel supply tube is connected to the fuel supply pipe and extends to a side of the vehicle body movement sensor.

20. A saddled vehicle comprising:
    an internal combustion engine configured to generate power;
    an air cleaner configured to take travel wind in an air cleaner box to purify air of the travel wind and configured to supply the purified air to the internal combustion engine; and
    a vehicle body movement sensor received in a recess and configured to measure movement of a vehicle body, the recess being defined by a flat surface that crosses a rear wall of the air cleaner box, wherein
    a coupler of a sensor harness is joined to the vehicle body movement sensor from behind, and
    the sensor harness is folded back into a U-shape to extend forward.

* * * * *